United States Patent
Yang et al.

(10) Patent No.: US 11,687,730 B1
(45) Date of Patent: Jun. 27, 2023

(54) AUTOMATED CONVERSATION GOAL DISCOVERY USING NEURAL NETWORKS AND DEEP MULTI-VIEW CLUSTERING

(71) Applicant: ASAPP, Inc., New York, NY (US)

(72) Inventors: Yi Yang, New York, NY (US); Hugh Nicholas Perkins, Long Island City, NY (US)

(73) Assignee: ASAPP, Inc., New York, NY (US)

( * ) Notice: Subject to any disclaimer, the term of this patent is extended or adjusted under 35 U.S.C. 154(b) by 273 days.

(21) Appl. No.: 17/319,797

(22) Filed: May 13, 2021

Related U.S. Application Data

(63) Continuation of application No. 16/418,046, filed on May 21, 2019, now abandoned.

(51) Int. Cl.
*G06F 40/35* (2020.01)
*G06F 40/284* (2020.01)
*G10L 15/16* (2006.01)

(52) U.S. Cl.
CPC ............ *G06F 40/35* (2020.01); *G06F 40/284* (2020.01); *G10L 15/16* (2013.01)

(58) Field of Classification Search
CPC ......... G06F 40/284; G06F 40/35; G10L 15/16
See application file for complete search history.

(56) References Cited

U.S. PATENT DOCUMENTS

| | | |
|---|---|---|
| 10,528,866 B1 | 1/2020 | Dai et al. |
| 2018/0013699 A1 | 1/2018 | Sapoznik et al. |
| 2019/0103095 A1 | 4/2019 | Singaraju et al. |
| 2019/0188590 A1 | 6/2019 | Wu et al. |
| 2019/0251165 A1 | 8/2019 | Bachrach et al. |
| 2020/0097820 A1 | 3/2020 | Song et al. |

(Continued)

FOREIGN PATENT DOCUMENTS

WO 2019076866 4/2019

OTHER PUBLICATIONS

Mrkšić, Nikola et al., "Multi-Domain Dialog State Tracking Using Recurrent Neural Networks", In Proceedings of the Association for Computational Linguistics (ACL) 2015.

(Continued)

*Primary Examiner* — Pierre Louis Desir
*Assistant Examiner* — Nicole A K Schmieder
(74) *Attorney, Agent, or Firm* — Lessani Law Group, PC

(57) ABSTRACT

The present disclosure describes a system, method, and computer program for automatically discovering goals from conversations using neural networks and deep multi-view clustering. A dataset of conversations is partitioned into two views. Vector representations of each view are then generated and clustered in an alternating fashion between views for a number of iterations (i.e., the system alternates between views in generating and clustering vector representations of a view). A first neural network encoder generates the vector representations for the first view, and a second neural network encoder generates the vector representations for the second view. With each semi-iteration, cluster assignments from one view are used to update the encoder for the other view, thus encouraging the two neural network encoders to yield similar cluster assignments. After all the iterations are complete, a user interface enables a user to label each first-view cluster with a goal, where a subset of example utterances is displayed for each cluster.

20 Claims, 6 Drawing Sheets

(56) References Cited

U.S. PATENT DOCUMENTS

2020/0218780 A1    7/2020  Mei et al.

OTHER PUBLICATIONS

Snell, Jake et al., "Prototypical Networks for Few-Shot Learning", In Neural Information Processing Systems (NIPS) 2017.
Lin, Bingqian et al., "Jointly Deep Multi-View Learning for Clustering Analysis", arXiv preprint arXiv:1808.06220, 2018.
Henderson, Matthew et al., "The Second Dialog State Tracking Challenge", In Proceedings of the Annual Meeting of the Special Interest Group on Discourse and Dialogue (SIGDIAL) 2014.
Chaudhuri, Kamalika et al., "Multi-View Clustering via Canonical Correlation Analysis", In Proceedings of the International Conference on Machine Learning (ICML) 2009.
Hemphill, Charies T., et al., "The Atis Spoken Language Systems Pilot Corpus", In Proceedings of the Workshop on Speech and Natural Language, 1990.
Jeon, Jiwoon, "Finding Similar Questions in Large Question and Answer Archives", In Proceedings of the ACM International Conference on Information and Knowledge Management (CIKM) 2005.
Henderson, Matthew et al., "Word-Based Dialog State Tracking with Recurrent Neural Networks", In Proceedings of the 15th Annual Meeting of the Special Interest Group on Discourse and Dialogue (SIGDIAL) 2014.
Budzianowski, Pawel, et al., "MultiWOZ—A Large-Scale Multi-Domain Wizard-of-Oz Dataset for Task-Oriented Dialogue Modelling", In Proceedings of Empirical Methods for Natural Language Processing (EMNLP) 2018.
Jansen, Bernard et al., "Classifying the User Intent of Web Queries Using k-means Clustering", Internet Research, vol. 20, No. 5, 2010.
Haponchyk, Iryna et al., "Supervised Clustering of Questions into Intents for Dialog System Applications", In Proceedings of Empirical Methods for Natural Language Processing (EMNLP) 2018.
Williams, Jason, "A Belief Tracking Challenge Task for Spoken Dialog Systems", In Proceedings of the NAACL-HLT Workshop on Future Directions and Needs in the Spoken Dialog Community, 2012.
Ciresan, Dan et al., "Multi-column Deep Neural Networks for Image Classification", In IEEE Conference on Computer Vision and Pattern Recognition, 2012.
Yang, Bo et al., "Towards k-means-friendly Spaces: Simultaneous Deep Learning and Clustering", In Proceedings of the International Conference on Machine Learning (ICML) 2016.
Shah, Darsh et al., "Adversarial Domain Adaptation for Duplicate Question Detection", In Proceedings of Empirical Methods for Natural Language Processing (EMNLP) 2018.
Kumar, Abhishek et al., "Co-regularized Multi-View Spectral Clustering", In Neural Information Processing Systems (NIPS) 2011.
Kanaan-Izquierdo, Samir et al., "Multiview and Multifeature Spectral Clustering Using Common Eigenvectors", Pattern Recognition Letters, 102, 2018.
Deepak, Padmanabhan "Mixkmeans: Clustering Question-Answer Archives", In Proceedings of Empirical Methods for Natural Language Processing (EMNLP) 2016.
Xie, Junyuan et al., "Unsupervised Deep Embedding for Clustering Analysis", In Proceedings of the International Conference on Machine Learning (ICML) 2016.
Cheung, Jackie Chi Kit et al., "Sequence Clustering and Labeling for Unsupervised Query Intent Discovery", In Proceedings of the ACM International Conference on Web Search and Data Mining (WSDM) 2012.
Sadikov, Eldar et al., "Clustering Query Refinements by User Intent", In Proceedings of the International Conference on World Wide Web, 2010.
Kim, Seokhwan et al., "The Fifth Dialog State Tracking Challenge", In Proceedings of the IEEE Spoken Language Technology Workshop (SLT) 2016.
Williams, Jason et al., The Dialog State Tracking Challenge, In Proceedings of the SIGDIAL Conference, 2013.
Logeswaran, Lajanugen et al., "An Efficient Framework for Learning Sentence Representations", In Proceedings of the International Conference on Learning Representations (ICLR) 2018.
Bickel, Steffen et al., "Multi-View Clustering", In Proceedings of the IEEE International Conference on Data Mining (ICDM) 2004.

AUTOMATED CONVERSATION GOAL DISCOVERY USING NEURAL NETWORKS AND DEEP MULTI-VIEW CLUSTERING

RELATED APPLICATION

This application is a continuation of U.S. patent application Ser. No. 16/418,046 titled "Automated Conversation Goal Discovery Using Neural Networks and Deep Multi-View Clustering," which was filed on May 21, 2019, the contents of which are incorporated by reference as if fully disclosed herein.

BACKGROUND OF THE INVENTION

1. Field of the Invention

This invention relates generally to automated conversation goal discovery using neural networks and, more specifically, to automatically discovering user goals in conversations using neural networks and deep multi-view clustering.

2. Description of the Background Art

Goal-oriented, automated dialog systems assist users to accomplish well-defined tasks with clear goals within limited number of dialog turns. They have been adopted in a wide range of applications, including booking flights and restaurants, providing tourist information, aiding in the customer support domain, and powering intelligent virtual assistants such as APPLI SIRI, AMAZON ALEXA, or GOOGLE ASSISTANT.

The first step towards building such systems is to determine the target tasks and construct corresponding ontologies to define a constrained set of dialog states and actions. Existing work in this area assumes that the target tasks are known in advance and excludes user goal discovery from the automated dialog system pipeline. While this suffices for simple systems with concrete and limited goals (e.g., restaurant booking), it is inadequate for automating more complex dialog systems. For example, in customer support and healthcare domains, there are many user goals that are hard to define beforehand. Moreover, the goals will evolve over time. Therefore, it is crucial to discover the range of goals from conversation histories. The "goal" of a conversation is what the user hopes to accomplish from the conversation, such as obtaining information or performing an action.

Prior work in discovering goals from conversation histories relies on supervised clustering of user first utterances in a conversation. The first utterances after the initial greetings typically represent the user's initial query/request. There are a number of deficiencies with this approach. Supervised clustering of a large and highly variable dataset requires a lot of human time in tagging the dataset. Unsupervised clustering is more efficient, but this has proved challenging to date due to semantic variations in conversations. Moreover, a user's goal is expressed not only in the user query/request, but also in the rest of the conversation. Therefore, there is demand for a more effective and efficient way to discover goals in a large and highly variable dataset of conversations, one that uses the whole conversation and unsupervised clustering.

SUMMARY OF THE DISCLOSURE

The present disclosure describes a system, method, and computer program for automatically discovering user goals from conversations using neural networks and deep multi-view clustering. A dataset of conversations is partitioned into two views. This results in a first view and a second view of each conversation in the dataset, with each view of a conversation comprising one or more utterances from the conversation. Vector representations of each view are then generated and clustered in an alternating fashion between views for a number of iterations (i.e., the system alternates between views in generating and clustering vector representations of a view). A first neural network encoder generates the vector representations for the first view, and a second neural network encoder generates the vector representations for the second view. With each semi-iteration of this alternating "generate and cluster" algorithm, cluster assignments from one view are used to update the encoder for the other view, thus encouraging the two neural network encoders to yield similar cluster assignments. Consequently, each iteration of the algorithm creates more agreement between the first-view and second-view cluster assignments.

The result of the above method is that conversations with the same goals are clustered together. After the iterations are complete, example utterances for each first-view cluster are displayed in a user interface, and a user is able to label each cluster with a goal.

In one embodiment, the method comprises the following steps:
(a) obtaining a dataset of conversations;
(b) obtaining a first view and a second view of the dataset, wherein a first view of a conversation comprises a first set of utterances from a first entity, and a second view of the same conversation comprises a second set of utterances in the conversation from both the first entity and one or more other entities;
(c) for each conversation in the dataset, using a first neural network encoder to encode the first view of the conversation into a first-view vector;
(d) clustering the first-view vectors into K clusters to obtain first-view cluster assignments, where K is an integer greater than 1;
(e) optimizing a second neural network encoder to predict the first-view cluster assignments using the second-view data and the first-view cluster assignments;
(f) for each conversation in the dataset, using the optimized second neural network to encode the second-view of the conversation into a second-view vector;
(g) clustering the second-view vectors into K clusters to obtain second-view cluster assignments;
(h) optimizing the first neural network encoder to predict the second-view cluster assignments using the first-view data and the second-view cluster assignments;
(i) generating new first-view vectors using the optimized first neural network encoder;
(j) clustering the new first-view vectors into K clusters to obtain new first-view cluster assignments;
(k) repeating steps (e)-(j) for a number of iterations; and
(l) providing a user interface that enables a user to label each first-view cluster with a goal, wherein providing the user interface includes displaying a subset of first query utterances for each of the first-view clusters.

DETAILED DESCRIPTION OF THE PREFERRED EMBODIMENTS

The present disclosure describes a system, method, and computer program for automatically discovering goals from conversations between two entities using deep multi-view clustering. The method is performed by a computer system ("the system").

1. Deep Multi-View Clustering

Figure 1A:
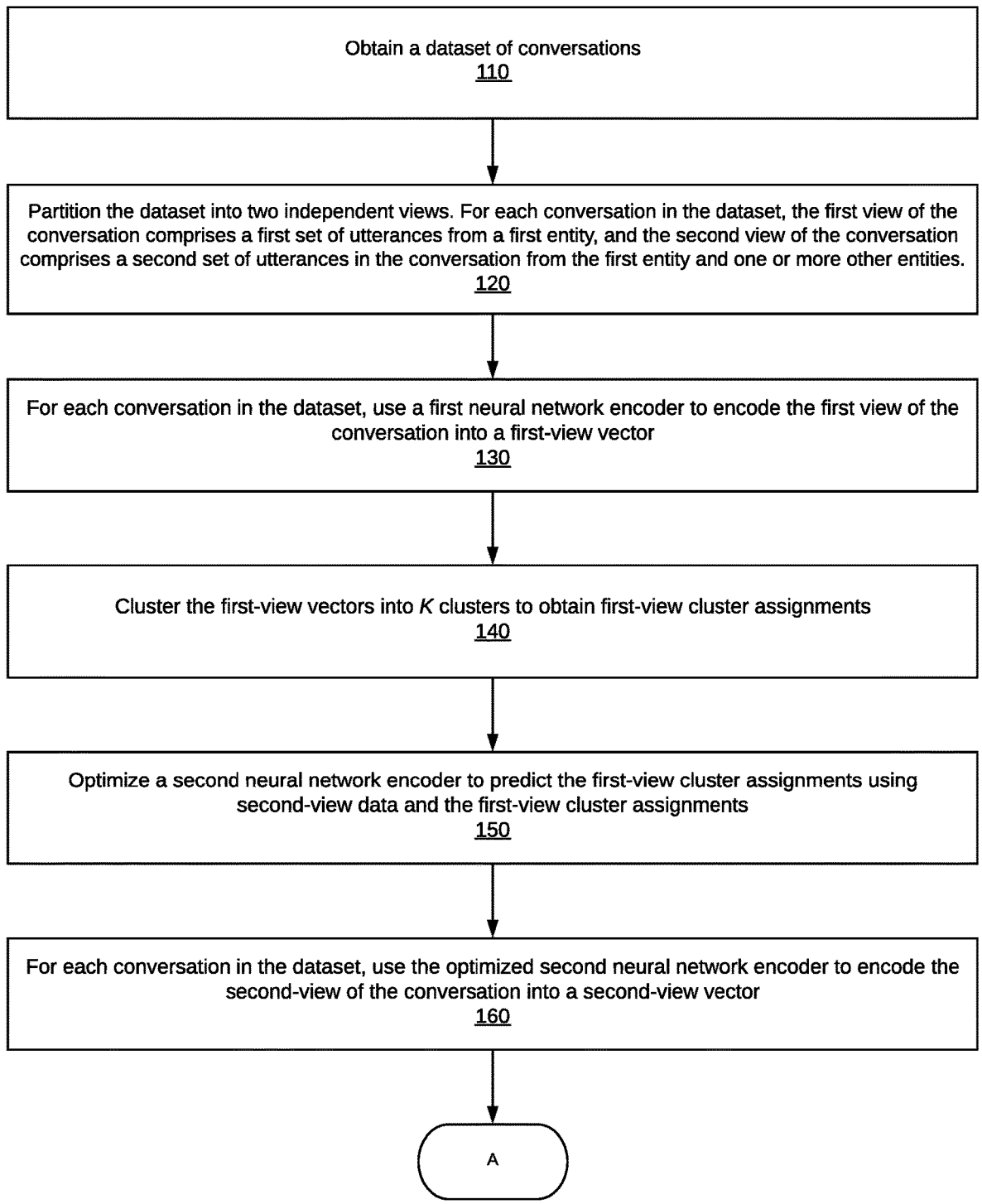
FIGS. 1A-1B are flowcharts that illustrates a method, according to one embodiment, for automatically discovering goals in conversations using deep multi-view clustering.
Figure 1B:
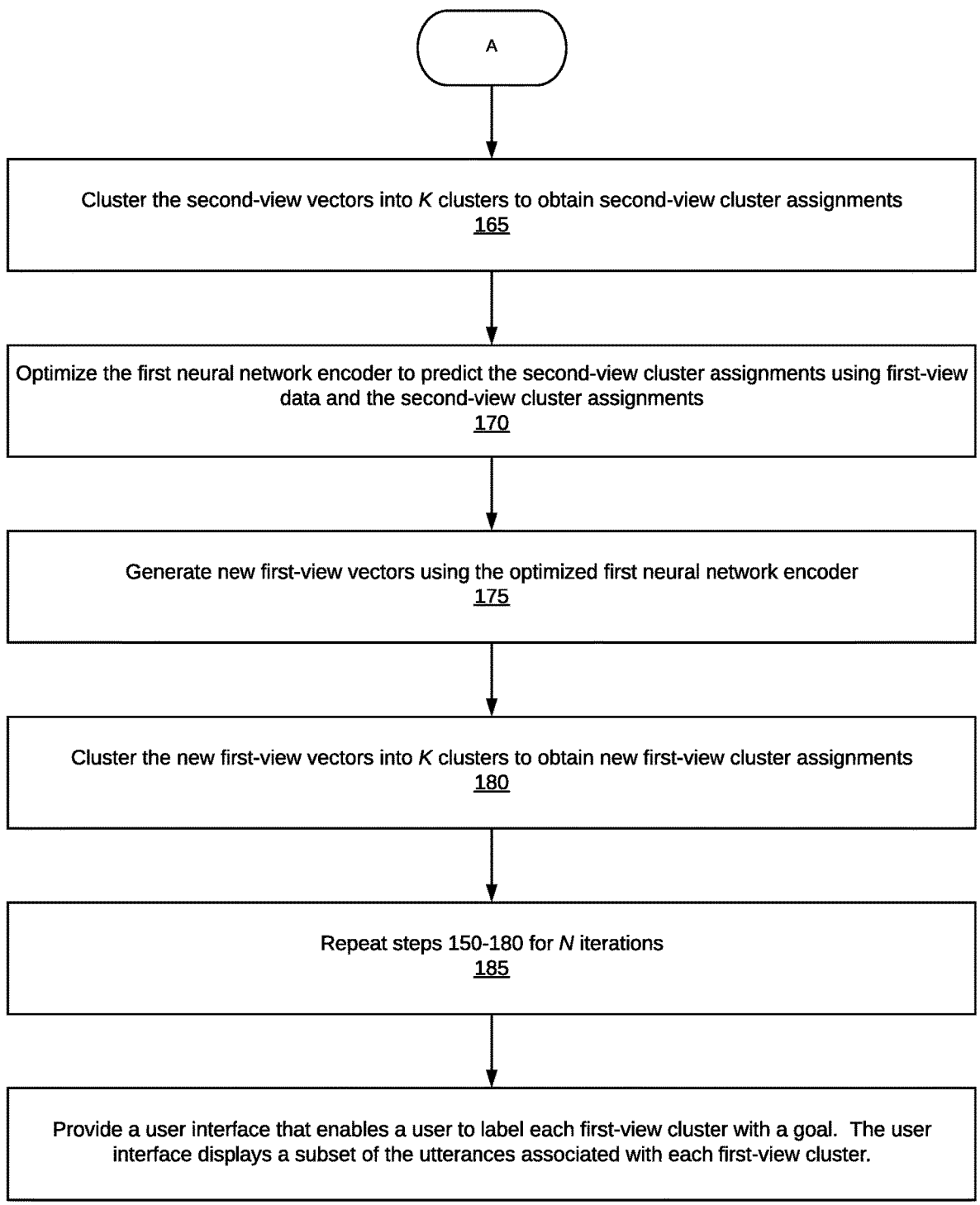

FIG. 1 illustrates a method for automatically discovering goals from conversations using deep multi-view clustering. The system obtains a dataset of conversations (step 110). A conversation comprises a sequence of utterances, $u_1, \ldots, u_n$, between two or more entities, wherein each utterance comprises a sequence of words, $u_i = w_1^i, \ldots, w_{m_i}^i$ for $i=1, \ldots, n$. An entity may be a person or a machine, such as a chatbot.

The system partitions the dataset into two independent views (step 120). For each conversation in the dataset, the first view of the conversation comprises a first set of utterances from a first entity, and the second view of the conversation comprises a second set of utterances in the conversation from the first entity and one or more other entities. In one embodiment, the first view of a conversation is the first utterance from the first entity that contains a query (a "first-query utterance"), ignoring any greetings, and the second view of the conversation comprises the remaining utterances between the first entity and one or more other entities. For example, in a conversation between a customer and an agent, the first view may be the first customer utterance including a query, ignoring any greetings, and the second view may be the remaining utterances in the conversation between the customer and the agent.

The length of a view is the total number of words in the view. In certain embodiments, each view may be truncated to a certain maximum allowable length (e.g., 125 words for the first view and 500 words for the second view).

For each conversation in the dataset, the system uses a first neural network encoder ("the first-view encoder" or "$Enc_1$") to encode the first view of the conversation into a vector representation (step 130). This results in a first-view vector for each conversation in the dataset. Methods for encoding a view into a vector representation are described in Section 2 below.

The system clusters the first-view vectors into K clusters to obtain first-view cluster assignments (step 140). K is an integer greater than 1. For example, K-means clustering may be used to cluster the vectors.

The first-view cluster assignments are then used to optimize a second neural network encoder. Specifically, the system optimizes a second neural network encoder ("the second-view encoder" or "$Enc_2$") to predict the first-view cluster assignments using second-view data and the first-view cluster assignments (step 150). The system uses the optimized second neural network encoder to encode each second view of a conversation into a second-view vector representation (step 160). This results in a second-view vector for each conversation in the dataset. In certain embodiments, the first and second-view vectors are in the same vector space.

The system clusters the second-view vectors into K clusters to obtain second-view cluster assignments (step 165). In this step, K is the same value as in step 140 (i.e., the number of clusters are the same). In one embodiment, the K centroids for the second-view clusters are initialized according to the first-view cluster assignments (i.e., each of the second-view centroids is initialized by taking the mean of all the second-view vectors corresponding to a given first-view cluster assignment).

The second-view cluster assignments are then used to update the first neural network encoder. Specifically, the system optimizes the first neural network encoder to predict the second-view cluster assignments using the first-view data (i.e., first-view vectors) and the second-view cluster assignments (step 170). The system uses the optimized first neural network encoder to generate new first-view vectors (step 175).

The system clusters the new first-view vectors into K clusters to obtain new first-view cluster assignments (step 180). In one embodiment, the K centroids for the new first-view clusters are initialized according to the second-view cluster assignments (i.e., each of the first-view centroids is initialized by taking the mean of all the first-view vectors corresponding to a given second-view cluster assignment).

The system repeats steps 150-180 for N iterations, where N is an integer greater than 1 (step 185). Each iteration creates more agreement between first-view cluster assignments and second-view cluster assignments for conversations.

N may be a fixed number, or N may be dynamically determined by the system ascertaining whether a percentage of conversations whose first-view cluster assignment and second-view cluster assignment agree is above a threshold (e.g., 90%). In the latter case, the system repeats steps 150-180 until the percentage is above the threshold.

After steps 150-180 have been performed for N iterations, the system provides a user interface that enables a user to label each first-view cluster with a goal (step 190). For each of the first-view clusters, the user interface displays a subset of the utterances associated with the cluster. In other words, a few example utterances from the first set of utterances are displayed for each first-view cluster. In embodiments where the first set of utterances correspond to a customer's first query, a plurality of example first-query utterances is displayed for each cluster. The example first-query utterances may be randomly selected from each cluster or they may be selected according to a criterion (e.g., the top 5 closest to the centroid in the cluster).

2. Encoding a View into a Vector Representation

As described above, neural network encoders are used transform each view of a conversation into a vector representation. The neural networks used in the encoders may be any neural network that can take as input a matrix of vectors, V, and produce as output a single vector, $z = Enc(V)$. The matrix of vectors may be a word-embedding matrix or an utterance-embedding matrix, as set forth below in Sections 2.1 and 2.2.

Examples of the types of neural networks that may be used are a deep averaging network, a convolution network, or a recurrent neural network, such as a Long Short-Term Memory (LSTM) network or a Simple Recurrent Unit (SRU) network. Encoder networks may include more than one layer.

The structure of a neural network encoder may be flat or hierarchical. A "flat encoder" treats a view as a sequence of words, creates a word-embedding matrix from the sequence of words, and uses a neural network to compute a single view vector from the word-embedding matrix. A "hierarchical encoder" treats a view as a sequence of utterances, uses a first neural network to encode each utterance into a single utterance vector, resulting in an utterance-embedding matrix for the view, and uses a second neural network to encode the utterance-embedding matrix into a view vector. Flat and hierarchical encoders are described in more detail with respect to Sections 2.1 and 2.2, respectively.

The first-view and second-view encoders may be flat or hierarchical. The two view encoders need not be of the same type. For example, the first-view encoder may be a flat encoder, and the second-view encoder may be hierarchical.

2.1 Flat Encoder

Figure 2:
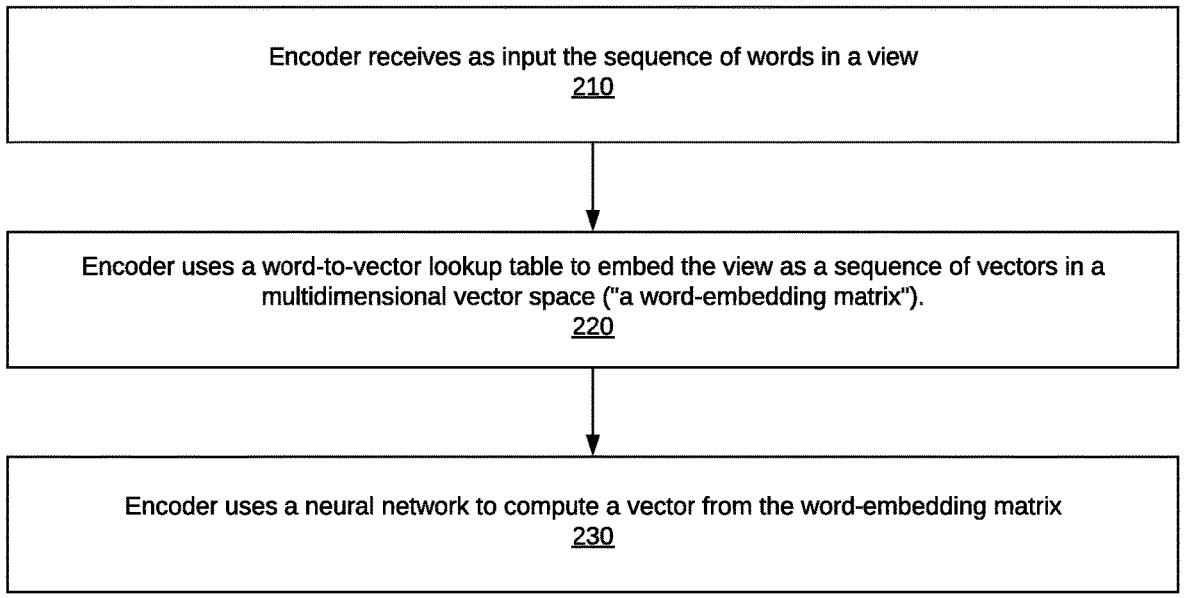
FIG. 2 is a flowchart that illustrates a method, according to one embodiment, for encoding a view into a vector when the encoder architecture is flat.

FIG. 2 illustrates a method for encoding a view into a vector when the encoder architecture is flat. The encoder receives as input a single sequence of words, $w_1, \ldots, w_m$ (step 210). For each view, the sequence of words are the words that make up the utterances in the view. The encoder embeds the view as a sequence of vectors, $x_1, \ldots, x_m$, in a multidimensional vector space using a word-to-vector lookup table that maps words to vectors (step 220). The vectors are aggregated in a row to create the resulting matrix, $X = x_1, \ldots, x_m$, which is referred to herein as a "word-embedding matrix." The encoder then uses a neural network to compute a single view vector, $z = \text{Enc}(X)$, from the word-embedding matrix (step 230).

Figure 3:
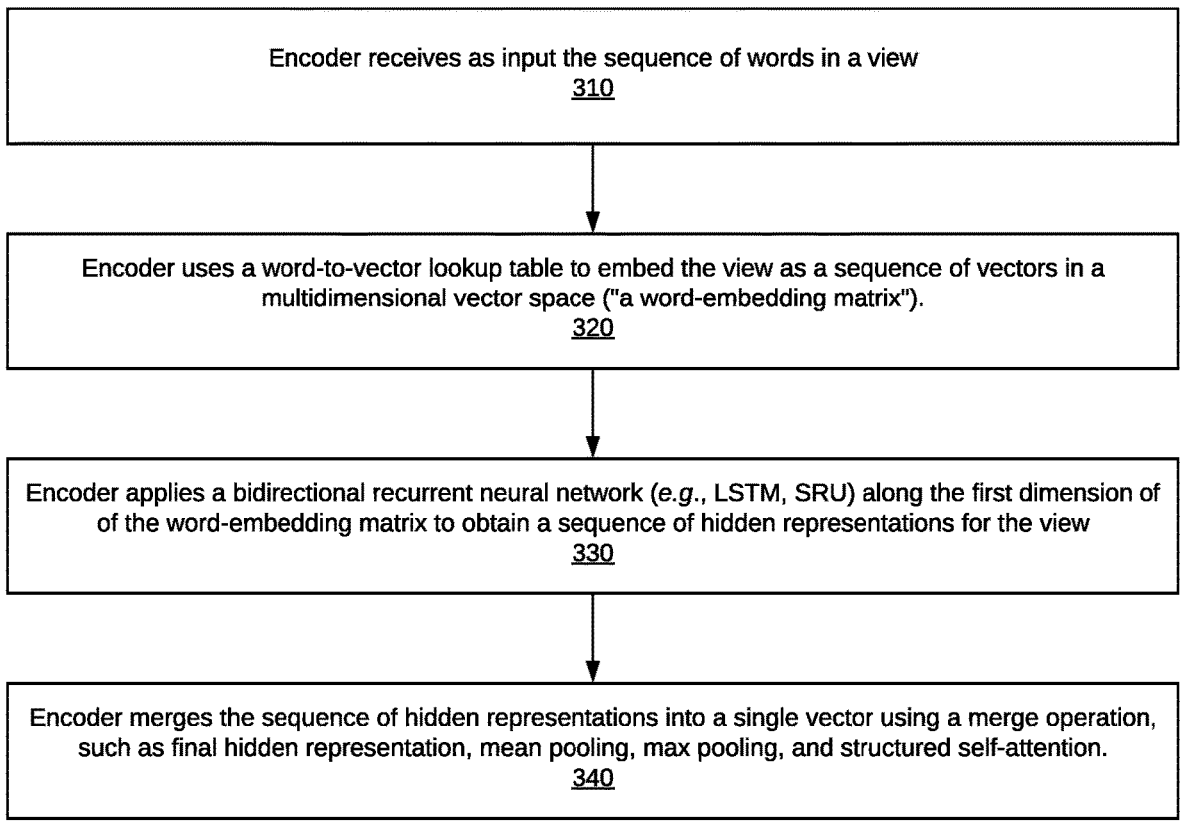
FIG. 3 is a flowchart that illustrates an example implementation of the method of FIG. 2.

FIG. 3 illustrates an example implementation of the method of FIG. 2. The encoder receives a sequence of words, $w_1, \ldots, w_m$, as input, wherein the sequence of words represents a view of a conversation (step 310). The encoder uses a word-to-vector lookup table to embed the view as a sequence of vectors in a multidimensional vector space ("a word-embedding vector"), resulting in a word-embedding matrix, $X = x_1, \ldots, x_m$, for the view (step 320). The encoder applies a bidirectional recurrent neural network along the first dimension of the word-embedding matrix to obtain a sequence of hidden representations for the view (step 330). More specifically, given the word-embedding matrix X of a conversation, the system applies a bidirectional recurrent neural network along the first dimension of the matrix to obtain a sequence of hidden representations $H = h_1, \ldots h_m \in \mathbb{R}^{2 \times d_{rnn}}$. These are computed by:

$$\vec{h}_0 = 0$$

$$\overleftarrow{h}_{m+1} = 0$$

$$\vec{h}_i = \text{RNN}(x_i, \vec{h}_{i-1}) \text{ for } i = 1, \ldots, m$$

$$\overleftarrow{h}_i = \text{RNN}(x_i, \overleftarrow{h}_{i+1}) \text{ for } i = 1, \ldots, m$$

$$h_i = [\vec{h}_i, \overleftarrow{h}_i] \text{ for } i = 1, \ldots, m$$

Here, RNN can by any recurrent neural network cell (e.g., an LSTM cell or an SRU cell.)

The encoder then merges the sequence of hidden representations into a single vector, z, using a merge operation, such as a final hidden representation, mean pooling, max pooling, or structured self attention (step 340). The single vector, z, is the embedding of the view. These merge operations are described in more detail below.

2.1.1 Output Merge Operations

Final Representation

In certain embodiments, the system uses the final hidden representations for the view vector, z:

$$z = [\vec{h}_m, \overleftarrow{h}_1]$$

Mean Pooling

In some implementations, the system uses the mean of the hidden representations as the view vector:

$$z = \frac{1}{m} \sum_{i=1}^{m} h_i$$

Max Pooling

In some implementations, the system uses the dimension-wise max of the hidden representations as the view vector:

$$z_n = \max_i h_{i,n} \text{ for } n = 1, \ldots, 2 * d_{rnn}$$

Structured Self-Attention

In some implementations, the system uses structured self-attention on the hidden representations:

$$\tilde{a}_i = \exp(V \tanh(U h_i))$$

$$a_i = \frac{\tilde{a}_i}{\sum_{j=1}^{m} \tilde{a}_j}$$

$$z = \frac{1}{\text{num\_heads}} \sum_{n=1}^{\text{num\_heads}} \sum_{i=1}^{m} a_{i,n} h_i^T$$

where U is a $2 * d_{rnn} \times d_{att}$ size matrix of parameters and V is a $d_{att} \times \text{num\_heads}$ size matrix of parameters. In this case the size of the encoder output is $d_{rnn}$. Alternatively:

$$z = \left[ \sum_{i=1}^{m} a_{i,1} h_i^T, \ldots, \sum_{i=1}^{m} a_{i,\text{num\_heads}} h_i^T \right]$$

In this case, the size of the encoder output is num_heads*d_rnn. "num_heads" is the number of weighted sums in the attention calculation.

2.2. Hierarchical Encoder

A hierarchical encoder treats a view as a sequence of utterances, $u_1, \ldots, u_n$, wherein each utterance comprises a sequence of words, $u_i = w_1^i, \ldots, w_{m_i}^i$ for $i = 1, \ldots, n$. A hierarchical encoder includes an utterance sub-encoder and a view sub-encoder.

Figure 4:
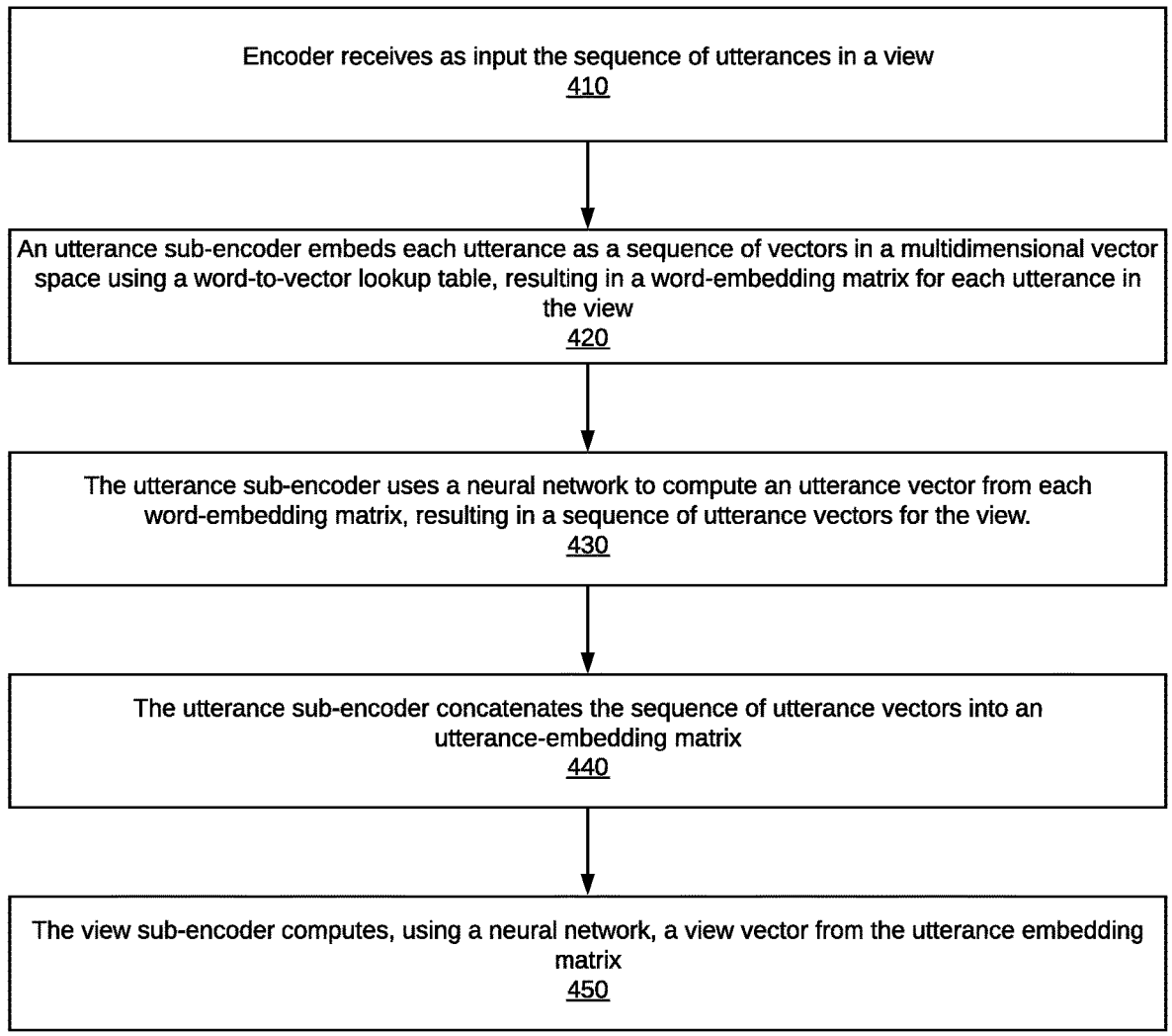
FIG. 4 is a flowchart that illustrates a method, according to one embodiment, for encoding a view into a vector when the encoder architecture is hierarchical.

FIG. 4 illustrates a method for encoding a view into a vector when the encoder architecture is hierarchical. The encoder receives as input the sequence of utterances in a view (step 410). An utterance sub-encoder embeds each utterance as a sequence of vectors in a multidimensional vector space using a word-to-vector lookup table (step 420). The word-to-vector lookup table is used to convert each word in the utterance into a vector. This results in a word-embedding matrix, $X_i = x_1^i, \ldots, x_{m_i}^i$, for each utterance.

The utterance sub-encoder computes, using a neural network, a single utterance vector, $y_i = \text{Enc}_{utterance}(X_i)$, for each word-embedding matrix corresponding to an utterance, resulting in a sequence of utterance vectors for the view (step 430). The utterance sub-encoder concatenates the sequence of utterance vectors into an utterance-embedding matrix, $Y = y_1, \ldots, y_n$ (step 440). A view sub-encoder computes, using a neural network, a view vector, z, from the utterance embedding matrix ($z = \text{Enc}_{view}(Y)$) (step 450).

3. Pretraining the Encoders

In certain embodiments, prior to performing the method of FIG. 1, the first and second-view encoders are pretrained using one of the three methods described below. Pretraining methods can be combined. For example, if an encoder is hierarchical, the utterance sub-encoder may be pretrained using the method described in Section 3.2, and the view sub-encoder may be trained using the method described in Section 3.1.

3.1 Optimizing Encoder to Predict a First View of a Conversation Given the Second View and a Pool of Candidate First Views A flat encoder or a view sub-encoder may be pretrained by optimizing the encoder to predict a first view of a conversation given a second view of a conversation and a pool of candidate views that include the first view of the conversation. Specifically, the system samples a batch of first and second-view data $(v_1^1, v_2^2), \ldots, (v_B^1, v_B^2)$ from the training dataset (the superscript represents the view). The encoders, $\text{Enc}_1$ and $\text{Enc}_2$, are used to encode the respective view in each pair to pairs of view vectors $(z_1^1, z_1^2), \ldots, (z_B^1, z_B^2)$. The system then computes the matrix $Z_{ij} = z_i^2 z_j^1$, and $$p(v_i^1 \text{ and } v_j^2 \text{ are views on the same conversation}) = \frac{\exp(Z_{ij})}{\sum_k \exp(Z_{ik})}$$

The objective function is then trained to maximize the likelihood that $v_i^1$ and $v_i^2$ are views on the same conversation by taking a gradient descent step to minimize the average negative log likelihood $$\frac{1}{B}\sum_{i=1}^{B} \log\left(\sum_j \exp(Z_{ij})\right) - Z_{ii}$$

of the correct view pairs coming from the same conversation. Once training is complete, $\text{Enc}_1$ and $\text{Enc}_2$ are used as the initial view encoders.

3.2 Optimizing an Utterance Sub-Encoder to Predict a Window of Surrounding Utterances given a Current Utterance and a Pool of Candidate Utterances An utterance sub-encoder may be pretrained by optimizing the utterance sub-encoder to predict a window of surrounding utterances given a current utterance and a pool of candidate utterances that includes the window of surrounding utterance (i.e., the encoder is optimized to predict the utterances that surround a given utterance). Specifically, a dataset is constructed consisting of windows of utterances $U = [u_{i-s}, \ldots, u_{i-1}, u_i, u_{i+1}, \ldots, u_{i+s}]$ of size s from the training data. The system samples a batch $U_1, \ldots, U_B$ of B windows from this dataset and also samples a non-central utterance from each window to form a set of pairs $(u_1^C, u_1^S), \ldots, (u_B^C, u_B^S)$, where the $u^C$ are the central utterances and $u^S$ are the samples from the respective windows. The utterance sub-encoder is used to encode the utterances into pairs of utterance embeddings $(y_1^1, y_1^2), \ldots, (y_B^1, y_B^2)$. The system then computes the matrix $Y_{ij} = y_i^1 y_j^2$, and:

$$p(u_j^2 \in U_i) = \frac{\exp(Y_{ij})}{\sum_k \exp(Y_{ik})}$$

The objective function is trained to maximize the likelihood that $u_i^2 \in U_i$ by taking a gradient descent step to minimize the average negative log likelihood $$\frac{1}{B}\sum_{i=1}^{B} \log\left(\sum_j \exp(Y_{ij})\right) - Y_{ii}$$

of the correct utterance pairs coming from the same window. Once training is complete, $\text{Enc}_1$ and $\text{Enc}_2$ are used as the initial view encoders.

3.3 Encoder Part of an Autoencoder

A flat encoder or an utterance sub-encoder in a hierarchical encoder may be pretrained as the encoder part of an autoencoder. The encoder part ("Enc") of an autoencoder can be any of the neural network types mentioned in section 2.3. The decoder part ("Dec") is typically a recurrent neural network. Given an input word sequence $w_1, \ldots, w_m$ (which can either be a view or an utterance, depending on the context), the system obtains the corresponding matrix of word embeddings $X = x_1, \ldots, x_m$ from a lookup table. The latent vector is obtained as $z = \text{Enc}(X)$. The latent vector, z, is concatenated to the input of the recurrent decoder in each time step. Let $\text{RNN}_{Dec}$ denote the cell of the decoder, then $h_{i+1} = \text{RNN}_{Dec}([x_i, z], h_i)$ for $i = 0, \ldots, m-1$, where $x_0$ is the embedding of a special start token and wherein the brackets, [ ], denote concatenation. Then $$p(w_i = V_j | w_1, \ldots, w_{i-1}) = \frac{\exp(Wh_i)_j}{\sum_k \exp(Wh_i)_k}$$

where V is the vocabulary and d is the hidden size of the decoder, and where W is a matrix of parameters of size $|V| \times d$. The auto-encoder is trained to maximize the likelihood of the correct next word by taking a gradient descent step to minimize the negative log likelihood $$\sum_{i=1}^{m} \log\left(\sum_j \exp(Wh_i)_j\right) - (Wh_i)_{*i}$$

where $*i$ is the index of $w_i$ in the vocabulary. Once training is complete, the decoder is discarded and the encoder (i.e., Enc) is used as the initial encoder for multi-view clustering.

4. Optimizing the First and Second Encoders with Each Multi-View Clustering Iteration As described with respect to FIG. 1, with each iteration of the multi-view clustering algorithm, the first encoder is optimized to predict second-view cluster assignments using first-view data and second-view cluster assignments. Likewise, the second encoder is optimized to predict first-view cluster assignment given second-view data and first-view cluster assignments. The encoders may be optimized according to one of the three methods described below.

4.1 Standard Class Prediction

In each of the methods, the encoders are optimized in accordance with an objective function. In this method, which is referred to herein as "Standard Class Prediction," the logits of the objective function are obtained by multiplying the applicable view vectors by a matrix of trainable parameters for the encoder. Specifically, in optimizing the first encoder in step 170, the logits of the objective function are obtained by multiplying the current first-view vectors by a matrix of trainable parameters, and the objective function is trained to predict the second-view cluster assignments from step 165. Likewise, in optimizing the second encoder in step 150, the logits of the objective function are obtained by multiplying the current second-view vectors by a matrix of trainable parameters, and the objective function is trained to predict the first-view cluster assignments (from step 140 in the first iteration, and then step 180 in subsequent iterations).

The Standard Class Prediction optimization method is described in more detail below. The explanation is provided with respect to optimizing the second encoder with first-view cluster assignments, but method for optimizing the first encoder is identical.

4.1.1 Detailed Explanation of Standard Class Prediction

Given the dataset of second views $\{v_i^2\}$ and given first view cluster assignments $c_i^1$ (the assignments are the indices of the respective clusters), the system samples a batch of pairs $(v_1^2, c_1^1), \ldots, (v_B^2, c_B^1)$ and use the second encoder $Enc_2$ to compute the second-view vectors $z_1^2, \ldots z_B^2$, and $$p(\text{conversation } i \text{ has first view in cluster } j) = \frac{\exp(Wz_i^2)_j}{\sum_k \exp(Wz_i^2)_k}$$

where W is a matrix of parameters of size K×d where d is the size of the second-view vectors. The standard prediction objective is then trained to maximize the likelihood that the $i^{th}$ conversation has the first view in cluster $c_i^1$ by taking a gradient descent step to minimize the average negative log likelihood $$\frac{1}{B}\sum_{i=1}^{B}\log\left(\sum_j \exp(Wz_i^2)_j\right) - (Wz_i^2)_{a_i^1}.$$

4.2 Centroid Class Prediction

The encoders may be optimized according to a method referred to herein as "Centroid Class Prediction." In optimizing the first encoder in step 170, the logits of the objective function are obtained by calculating the negative distances between the current first-view vectors and centroids of the second-view cluster assignments from step 165, and the objective function is trained to the predict second-view cluster assignments. In optimizing the second encoder in step 150, the logits of the objective function are obtained by calculating the negative distances between the current second-view vectors and centroids of the first-view cluster assignments (which are first obtained in step 140, and then in step 180 in subsequent iterations), and training the objective function to predict the first-view cluster assignments.

The Centroid Class Prediction optimization method is described in more detail below. The explanation is provided with respect to optimizing the second encoder with first-view cluster assignments, but method for optimizing the first encoder is identical.

4.2.1 Detailed Explanation of Centroid Class Prediction

Given the dataset of second views $\{v_i^2\}$ and given first view cluster assignments $c_i^1$ (where we assume the assignments are the indices of the respective clusters), we sample a batch of pairs $(v_1^2, c_1^1), \ldots, (v_B^2, c_B^1)$ and use the second encoder $Enc_2$ to compute the second-view vectors $z_1^2, \ldots z_B^2$, and $$p(\text{conversation } i \text{ has first view in cluster } j) = \frac{\exp(-\|C_j^1 - z_i^2\|_2)}{\sum_k \exp(-\|C_k^1 - z_i^2\|_2)}$$

where $C^1$ is the matrix whose ith row is the centroid of the ith first view cluster and $\|\ \|_2$ denotes the Euclidean distance. Then the average negative log likelihood is given by $$\frac{1}{B}\sum_{i=1}^{B}\log\left(\sum_j \exp(-\|C_j^1 - z_i^2\|_2)_j\right) + \|C_{c_j^1}^1 - z_i^2\|_2.$$

The matrix $C^1$ is fixed and not updated during this step of training.

4.3 Prototypical Class Prediction

The encoders may be optimized according to a method referred to herein as "Prototypical Class Prediction." In optimizing the first encoder in step 170, the logits of the objective function for the Prototypical Class Prediction method are calculated by (1) obtaining a sample of current first-view vectors corresponding to one of the second-view cluster assignments in step 165 and calculating the mean of the sample, (2) obtaining another first-view vector corresponding to the same second-view cluster assignment as a "query point," (3) calculating the negative distance between the means of the sample and the query point, and (4) repeating steps (1)-(3) for a plurality of second-view clusters. The objective function is then trained to predict the second-view cluster assignments. A first-view vector corresponds to a second-view cluster if the conversation represented by the first-view vector has a second-view vector in second-view cluster.

In optimizing the second encoder in step 150, the logits of the objective function are calculated by (1) obtaining a sample of current second-view vectors corresponding to one of the first-view cluster assignments (first from step 140, then from step 180 in sequent iterations) and calculating the mean of the sample, (2) obtaining another second-view vector corresponding to the same second-view cluster assignment as a "query point", (3) calculating the negative distance between the means of the sample and the query point, and (4) repeating steps (1)-(3) for a plurality of first-view clusters. The objective function is then trained to predict the first-view cluster assignments.

The Prototypical Class Prediction optimization method is described in more detail below. The explanation is provided with respect to optimizing the second encoder with first-view cluster assignments, but method for optimizing the first encoder is identical.

4.3.1 Detailed Explanation of Prototypical Class Prediction

The system samples a batch $c_1^1, \ldots, c_B^1$ of first-view clusters, and, from each sampled cluster, the system samples A second-view vectors corresponding to the first-view cluster, where A is an integer greater than 1. A second-view vector corresponds to a first-view cluster if the conversation represented by the second-view vector has a first-view vector in first-view cluster. These A second-view vectors are "anchor points" for the purpose of this method, and are denoted $a_{1,c_i}^2, \ldots a_{A,c_i}^2$. The mean of the anchor point is taken. Let $$a_{c_i^1}^2 = \frac{1}{A}\sum_j a_{j,c_i^1}^2,$$

where $a_{c_i}^2$ of the anchor points from the $i^{th}$ first-view cluster. Form each sampled cluster, the system obtains another second-view vector for use as a "query point." The query point is denoted $q_{c_i}^2$. Then, the system computes:

$$p(\text{query conversation } i \text{ has first view in cluster } c_j^1) = \frac{\exp\left(-\left\|q_{c_i}^2 - a_{c_j}^2\right\|_2\right)}{\sum_k \exp\left(-\left\|q_{c_i}^2 - a_{c_k}^2\right\|_2\right)}$$

The objective function is trained to maximize the likelihood that the $i^{th}$ query conversation has first view cluster $c_i^1$ by taking a gradient descent step to minimize the average log likelihood $$\frac{1}{B}\sum_{i=1}^{B} \log\left(\sum_j \exp\left(-\left\|q_{c_i}^2 - a_{c_j}^2\right\|_2\right)\right) + \left\|q_{c_i}^2 - a_{c_i}^2\right\|_2.$$

5. Example Software Architecture

Figure 5:
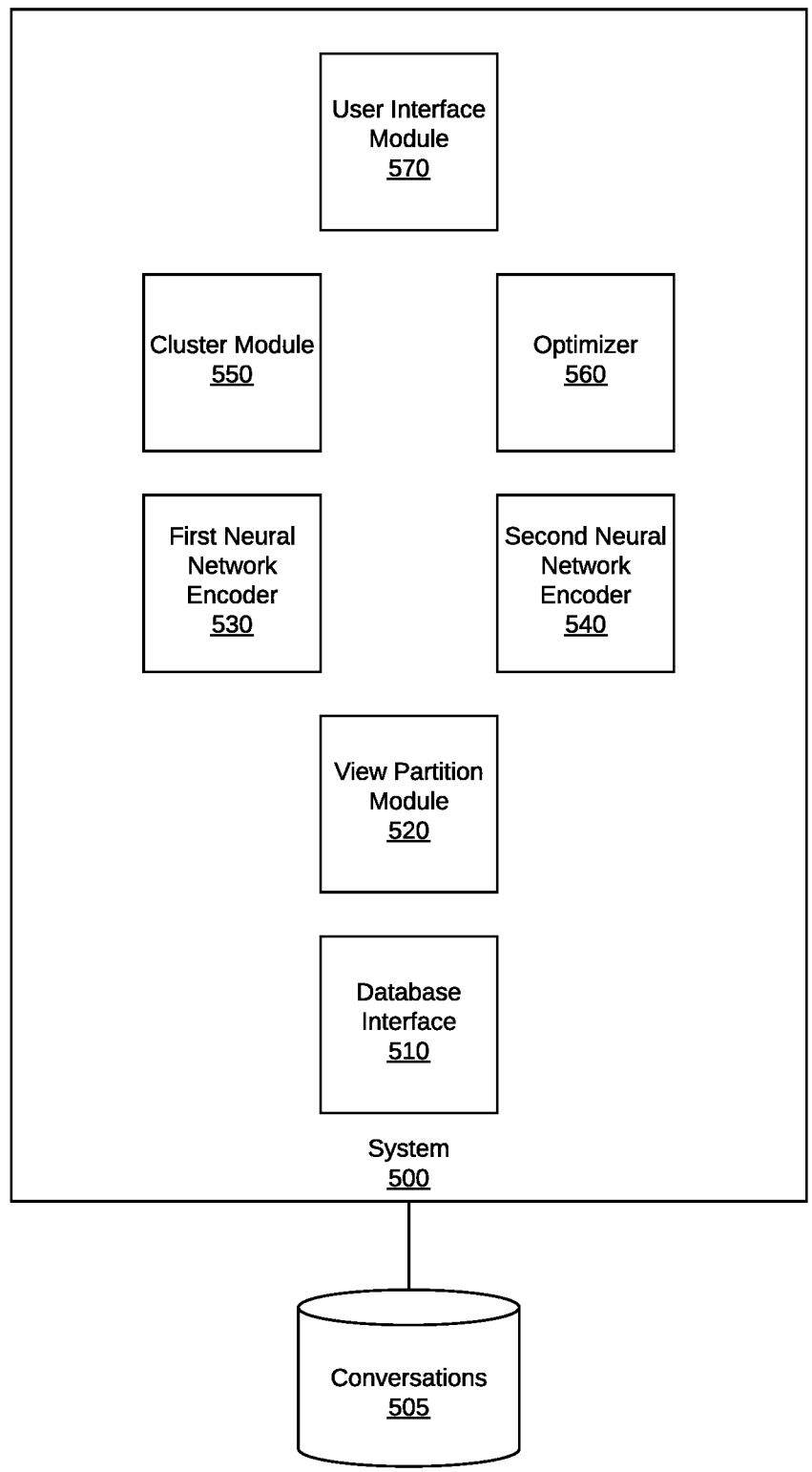
FIG. 5 is a block diagram of an example software architecture for a computer system that automatically discovers goals in conversations between two or more entities.

FIG. 5 illustrates an example system for performing the methods described herein. The methods described herein may be implemented in other systems and are not limited to system 500. The system includes a Database Interface Module 510 that stores and retrieves conversation datasets from Database 505. A View Partition Module 520 partitions a dataset into two views. The First Neural Network Encoder 530 and the Second Neural Network Encoders 540 encode the first and second views of the data into the first-view vectors and second-view vectors, respectively, as described above. The Cluster Module 550 clusters the first-view vectors and second-view vectors as described with respect to the clustering steps in FIG. 1. The Optimizer Module 560 updates the parameters of Encoders 530, 540 as described above. The User Interface Module 570 generates the user interface that enables users to label each final first-view cluster with a goal.

6. General

The methods described with respect to FIGS. 1-5 are embodied in software and performed by a computer system (comprising one or more computing devices) executing the software. A person skilled in the art would understand that a computer system has one or more physical memory units, disks, or other physical, computer-readable storage media for storing software instructions, as well as one or more processors for executing the software instructions.

As will be understood by those familiar with the art, the invention may be embodied in other specific forms without departing from the spirit or essential characteristics thereof. Accordingly, the above disclosure is intended to be illustrative, but not limiting, of the scope of the invention, which is set forth in the following claims.

The invention claimed is:

1. A method, performed by a computer system, for automatically discovering goals from conversations between two or more entities, the method comprising:
    (a) obtaining a dataset of conversations;
    (b) obtaining a first view and a second view of the dataset, wherein a first view of a conversation comprises a first set of utterances from a first entity, and a second view of the same conversation comprises a second set of utterances in the conversation from both the first entity and one or more other entities;
    (c) for each conversation in the dataset, using a first neural network encoder to encode the first view of the conversation into a first-view vector;
    (d) clustering the first-view vectors into K clusters to obtain first-view cluster assignments, wherein K is an integer greater than 1 and wherein the clustering is unsupervised;
    (e) optimizing a second neural network encoder to predict the first-view cluster assignments using only the second-view data and the first-view cluster assignments;
    (f) for each conversation in the dataset, using the optimized second neural network to encode the second-view of the conversation into a second-view vector;
    (g) clustering the second-view vectors into K clusters to obtain second-view cluster assignments, wherein the clustering is unsupervised;
    (h) optimizing the first neural network encoder to predict the second-view cluster assignments using only the first-view data and the second-view cluster assignments;
    (i) generating new first-view vectors using the optimized first neural network encoder;
    (j) clustering the new first-view vectors into K clusters to obtain new first-view cluster assignments, wherein the clustering is unsupervised;
    (k) repeating steps (e)-(j) for a number of iterations until the first neural network encoder and the second neural network encoder yield similar cluster assignments such that the first-view cluster assignment and the second-view cluster assignment are in agreement above a threshold; and
    (l) providing a user interface that enables a user to label each first-view cluster with a goal, wherein providing the user interface includes displaying a subset of the first set of utterances for each of the first-view clusters.

2. The method of claim 1, wherein at least one of the first and second neural network encoders is a flat encoder that encodes a view into a view vector according to a method comprising:
    obtaining a sequence of words that make up the utterances in the view;
    embedding the view as a sequence of vectors in a multi-dimensional vector space using a word-to-vector lookup table, resulting in a word-embedding matrix; and using a neural network to compute a view vector from the word-embedding matrix.

3. The method of claim 2, wherein the neural network is one of the following: a deep averaging network, a convolution network, or a recurrent neural network.

4. The method of claim 1, wherein at least one of the first and second neural network encoders is a hierarchical encoder comprising an utterance sub-encoder and a view sub-encoder, and wherein the hierarchical encoder treats a view as a sequence of utterances, wherein each utterance comprises a sequence of words, and wherein the hierarchical encoder encodes a view into a vector according to a method comprising:
  embedding each utterance as a sequence of vectors in a multidimensional vector space using a word-to-vector look up table, resulting in a word-embedding matrix for each utterance;
  using the utterance sub-encoder to compute an utterance vector for each word-embedding matrix corresponding to an utterance, resulting in a sequence of utterance vectors for the view;
  concatenating the sequence of utterance vectors into an utterance-embedding matrix; and
  using a view sub-encoder to compute a view vector from the utterance-embedding matrix.

5. The method of claim 4, wherein the utterance sub-encoder and the view-sub encoder each use a neural network to compute a vector and the neural network is one of the following: a deep averaging network, a convolution network, or a recurrent neural network.

6. The method of claim 4, wherein, prior to the clustering steps, the utterance sub-encoder is pretrained by predicting a window of surrounding utterances given a current utterance and a pool of candidate utterances that includes the window of surrounding utterances.

7. The method of claim 1, wherein, prior to the clustering steps, at least one of the first and second neural network encoders is pretrained by optimizing the encoder to predict a first view of a conversation given a second view of the conversation and a pool of candidate views that include the first view of the conversation.

8. The method of claim 1, wherein, prior to the clustering steps, at least one of the first and second neural networks is pretrained as an encoder part of an autoencoder.

9. The method of claim 1, wherein the number of iterations is dynamically determined by ascertaining whether a percentage of conversations whose first-view cluster assignment and second-view cluster assignment agree is above a threshold.

10. The method of claim 1, wherein the first view of a conversation comprises one or more first query utterances from a first entity, and the second view of the same conversation comprises the remaining utterances in the conversation from both the first entity and a second entity.

11. The method of claim 1, wherein, in step (g), K centroids for the second-view clusters are initialized by computing the means of the second-view vectors according to the first-view cluster assignments.

12. The method of claim 1, wherein, in step (j), K centroids for the new first-view clusters are initialized by computing the means of the first-view vectors according to the second-view cluster assignments.

13. The method of claim 1, wherein optimizing each of the first and second neural network encoders comprises adjusting parameters of the encoder using an objective function comprising a multinomial logistic regression layer.

14. The method of claim 13, wherein:
in adjusting the parameters of the first neural network encoder, logits of the objective function are obtained by multiplying the first-view vectors by a matrix of trainable parameters, and the objective function is trained to predict the second-view cluster assignments; and
in adjusting the parameters of the second neural network encoder, logits of the objective function are obtained by multiplying the second-view vectors by a matrix of trainable parameters, and the objective function is trained to predict first-view cluster assignments.

15. The method of claim 13, wherein:
in adjusting the parameters of the first neural network encoder, logits of the objective function are obtained by calculating the negative distances between the first-view vectors and centroids of second-view cluster assignments, and the objective function is trained to predict second-view cluster assignments; and
in adjusting parameters of the second neural network encoder, logits of the objective function are obtained by calculating the negative distances between the second view vectors and centroids of the first-view cluster assignments, and the objective function is trained to predict first-view cluster assignments.

16. The method of claim 13, wherein:
in adjusting the parameters of the first neural network encoder, logits of the objective function are calculated as follows:
  (i) obtaining a sample of first-view vectors corresponding to a second-view cluster assignment, and calculating a mean of the sample;
  (ii) obtaining another first-view vector corresponding to the same second-view cluster assignment, wherein the other first-view vector is a query point for the purpose of calculating the logits of the objective function;
  (iii) calculating the negative distance between the mean of the sample and the query point; and
  (iv) repeating steps (i)-(iii) for a plurality of second-view clusters;
in adjusting the parameters of the second neural network encoder, logits of the objective function are calculated as follows:
  (v) obtaining a sample of second-view vectors corresponding to a first-view cluster assignment, and calculating a mean of the sample;
  (vi) obtaining another second-view vector corresponding to the same first-view cluster assignment, wherein the other second-view vector is a query point for the purpose of calculating the logits of the objective function; and
  (vii) calculating the negative distance between the mean of the sample and the query point; and
  (viii) repeating steps (v)-(vii) for a plurality of first-view clusters.

17. A non-transitory computer-readable medium comprising a computer program, that, when executed by a computer system, enables the computer system to perform the following method for automatically discovering goals from conversations between two or more entities, the method comprising:
  (a) obtaining a dataset of conversations;
  (b) obtaining a first view and a second view of the dataset, wherein a first view of a conversation comprises a first set of utterances from a first entity, and a second view of the same conversation comprises a second set of utterances in the conversation from both the first entity and one or more other entities;

(c) for each conversation in the dataset, using a first neural network encoder to encode the first view of the conversation into a first-view vector;

(d) clustering the first-view vectors into K clusters to obtain first-view cluster assignments, wherein K is an integer greater than 1 and wherein the clustering is unsupervised;

(e) optimizing a second neural network encoder to predict the first-view cluster assignments using only the second-view data and the first-view cluster assignments;

(f) for each conversation in the dataset, using the optimized second neural network to encode the second-view of the conversation into a second-view vector;

(g) clustering the second-view vectors into K clusters to obtain second-view cluster assignments, wherein the clustering is unsupervised;

(h) optimizing the first neural network encoder to predict the second-view cluster assignments using only the first-view data and the second-view cluster assignments;

(i) generating new first-view vectors using the optimized first neural network encoder;

(j) clustering the new first-view vectors into K clusters to obtain new first-view cluster assignments, wherein the clustering is unsupervised;

(k) repeating steps (e)-(j) for a number of iterations until the first neural network encoder and the second neural network encoder yield similar cluster assignments such that the first-view cluster assignment and the second-view cluster assignment are in agreement above a threshold; and (l) providing a user interface that enables a user to label each first-view cluster with a goal, wherein providing the user interface includes displaying a subset of the first set of utterances for each of the first-view clusters.

18. The non-transitory computer-readable medium of claim 17, wherein, prior to the clustering steps, each of the first and second neural network encoders is pretrained by optimizing the encoder to predict a first view of a conversation given a second view of the conversation and a pool of candidate views that include the first view of the conversation.

19. A computer system for automatically discovering goals from conversations between two or more entities, the system comprising:

one or more processors;

one or more memory units coupled to the one or more processors, wherein the one or more memory units store instructions that, when executed by the one or more processors, cause the system to perform the operations of:

(a) obtaining a dataset of conversations;

(b) obtaining a first view and a second view of the data set, wherein a first view of a conversation comprises a first set of utterances from a first entity, and a second view of the same conversation comprises a second set of utterances in the conversation from both the first entity and one or more other entities;

(c) for each conversation in the dataset, using a first neural network encoder to encode the first view of the conversation into a first-view vector;

(d) clustering the first-view vectors into K clusters to obtain first-view cluster assignments, wherein K is an integer greater than 1 and wherein the clustering is unsupervised;

(e) optimizing a second neural network encoder to predict the first-view cluster assignments using only the second-view data and the first-view cluster assignments;

(f) for each conversation in the dataset, using the optimized second neural network to encode the second-view of the conversation into a second-view vector;

(g) clustering the second-view vectors into K clusters to obtain second-view cluster assignments, wherein the clustering is unsupervised;

(h) optimizing the first neural network encoder to predict the second-view cluster assignments using only the first-view data and the second-view cluster assignments;

(i) generating new first-view vectors using the optimized first neural network encoder;

(j) clustering the new first-view vectors into K clusters to obtain new first-view cluster assignments, wherein the clustering is unsupervised;

(k) repeating steps (e)-(j) for a number of iterations until the first neural network encoder and the second neural network encoder yield similar cluster assignments such that the first-view cluster assignment and the second-view cluster assignment are in agreement above a threshold; and (l) providing a user interface that enables a user to label each first-view cluster with a goal, wherein providing the user interface includes displaying a subset of the first set of utterances for each of the first-view clusters.

20. The system of claim 19, wherein, prior to the clustering steps, each of the first and second neural network encoders is pretrained by optimizing the encoder to predict a first view of a conversation given a second view of the conversation and a pool of candidate views that include the first view of the conversation.

* * * * *